(12) United States Patent
Howard et al.

(10) Patent No.: US 7,755,485 B2
(45) Date of Patent: Jul. 13, 2010

(54) SYSTEM AND METHOD FOR ELECTRONIC ARTICLE SURVEILLANCE

(75) Inventors: Richard E. Howard, Highland Park, NJ (US); Eitan M. Fenson, Los Altos, CA (US)

(73) Assignee: InPoint Systems, Inc., Los Altos, CA (US)

( * ) Notice: Subject to any disclaimer, the term of this patent is extended or adjusted under 35 U.S.C. 154(b) by 999 days.

(21) Appl. No.: 11/076,576

(22) Filed: Mar. 8, 2005

(65) Prior Publication Data

US 2006/0203838 A1 Sep. 14, 2006

(51) Int. Cl.
G08B 13/14 (2006.01)
(52) U.S. Cl. ............... 340/572.1; 340/10.1; 342/42; 455/39
(58) Field of Classification Search ........... 340/568.1, 340/571, 572.1, 10.1, 442; 342/42; 455/39
See application file for complete search history.

(56) References Cited

U.S. PATENT DOCUMENTS

| | | | |
|---|---|---|---|
| 4,774,504 A | | 9/1988 | Hartings |
| 4,800,590 A | * | 1/1989 | Vaughan ............. 713/184 |
| 5,489,908 A | * | 2/1996 | Orthmann et al. ........ 340/10.32 |
| 5,588,913 A | * | 12/1996 | Hecht ............... 463/19 |
| 5,774,876 A | * | 6/1998 | Woolley et al. ........... 705/28 |
| 5,821,859 A | | 10/1998 | Schrott et al. |
| 5,949,336 A | | 9/1999 | Deschenes et al. |
| 5,955,951 A | | 9/1999 | Wischerop et al. |
| 5,979,196 A | | 11/1999 | Vanmoor |
| 5,982,284 A | | 11/1999 | Baldwin et al. |
| 6,254,953 B1 | | 7/2001 | Elston |
| 6,255,958 B1 | | 7/2001 | Haimovich et al. |
| 6,297,734 B1 | * | 10/2001 | Richardson et al. .... 340/539.26 |
| 6,304,182 B1 | | 10/2001 | Mori et al. |
| 6,750,765 B1 | * | 6/2004 | van Wijk ............ 340/505 |
| 6,753,783 B2 | * | 6/2004 | Friedman et al. ........ 340/573.7 |
| 6,801,130 B2 | | 10/2004 | Campero |
| 6,830,181 B1 | | 12/2004 | Bennett |
| 6,960,999 B2 | * | 11/2005 | Haimovitch et al. ..... 340/572.1 |
| 6,967,577 B2 | * | 11/2005 | Taylor et al. ........... 340/572.1 |
| 7,129,837 B2 | * | 10/2006 | Shannon et al. ........ 340/539.13 |
| 7,148,793 B2 | * | 12/2006 | Lin .................. 340/442 |
| 7,256,682 B2 | * | 8/2007 | Sweeney, II ........... 340/10.1 |
| 2002/0158761 A1 | | 10/2002 | Runyon et al. |
| 2003/0007473 A1 | * | 1/2003 | Strong et al. ............ 370/338 |
| 2004/0046642 A1 | * | 3/2004 | Becker et al. ........... 340/10.32 |
| 2004/0066278 A1 | * | 4/2004 | Hughes et al. ........... 340/10.1 |
| 2005/0040950 A1 | | 2/2005 | Clucas |
| 2006/0061472 A1 | * | 3/2006 | Lovoi et al. ............ 340/572.1 |

FOREIGN PATENT DOCUMENTS

GB 1309090 * 3/1973

* cited by examiner

*Primary Examiner*—Toan N Pham
*Assistant Examiner*—Kerri McNally
(74) *Attorney, Agent, or Firm*—Arent Fox LLP; Michael Fainberg (57) ABSTRACT

An EAS tag polling system includes a plurality of EAS tags and a base station, wherein each of the tags transmits an acknowledgement to the base station. The base acknowledgments may be sent passively or actively in response to a request from the base station. The base station discriminates between each acknowledgment received and associates it to the tag from which it had been transmitted. From each acknowledgement received, the base station indicates that a positive response is associated with each of the tags from which the acknowledgement is received and a negative response is associated with each of the tags from which the acknowledgement is not received.

176 Claims, 2 Drawing Sheets

SYSTEM AND METHOD FOR ELECTRONIC ARTICLE SURVEILLANCE

BACKGROUND OF THE INVENTION

1. Field of the Invention

The present invention relates generally to electronic article surveillance (EAS) systems and EAS tags used in such systems and, more particularly, to an EAS tag polling system in which a plurality of tags are polled by a base station to determine whether a positive response or a negative response is to be associated with each one of the tags.

2. Description of the Related Art

Electronic article surveillance systems have become commonplace for both inventory control and theft prevention of merchandise. For example, to prevent theft an EAS tag is affixed to an item of merchandise that has been made available for consumer selection and purchase within a retail store. The tag may be removably attached to the item of merchandise desired to be protected, or permanently or semi-permanently affixed to such item. Upon purchase of the tagged item at a checkout counter, the tag is removed or otherwise disabled by a sales clerk or other store employee upon payment being tendered for the item. However, should one attempt to shoplift the tagged item, such as by surreptitiously concealing the tagged item, an alarm will sound when the tag is passed through a detector which is typically located in close proximity to an exit of the store.

A removably attached tag generally includes a key latch mechanism on one hinged portion of the tag housing that locks to a pin projecting from an opposing hinged portion of the tag housing. The pin is passed through the item, typically a garment, and into the lock mechanism of the tag. Upon sale of the tagged garment, a sales clerk uses a unique key or decoupler to unlock the pin from the lock mechanism so that tag can be removed.

A permanently or semi-permanently attached tag generally is glued or otherwise affixed to the item itself, to a paper fiber box containing such item or to shrink wrap sealing such box. When affixed directly to the item or to the box, the tag may be placed inside either one where it is not visible and, therefore, its presence may not be known to one who would attempt to shoplift such item. This type of tag is most prevalent for use with small items such as audio and software CDs, and electronic items and components. Upon sale of the item, the sales clerk needs to disable the tag so that the consumer can safely pass the detector located at the exit of the store without triggering the alarm, as would otherwise occur should the tag not have been previously disabled.

The EAS tags of the type described above typically include a passive resonant LC circuit enclosed within a nonmetallic housing. The LC resonant circuit includes a capacitor and an inductor typically formed as metallic foil elements on a suitable substrate. Such construction allows for the tag to be relatively small and inconspicuous, especially for the permanent or semi-permanent type tag. To disable the permanently or semi-permanently attached tag, the sales clerk passes the tag through a relatively strong RF signal that is picked up by the inductor windings. In turn, a current surge is induced in the windings and this current is of sufficient amplitude to "break" one or more of the resonant circuit elements, typically the capacitor, or a resistive element or fuse within the circuit. Features and descriptions of EAS tags and systems of the type as described above may be found in whole or in part in U.S. Pat. No. 4,774,504; U.S. Pat. No. 5,949,336; U.S. Pat. No. 5,955,951; U.S. Pat. No. 5,979,196; U.S. Pat. No. 5,982,284; U.S. Pat. No. 6,254,953; and U.S. Pat. No. 6,304,182.

As set forth above, a detector is placed in close proximity to each exit of the store in order to alert store employees and security of an attempt to shoplift the tagged item. The detector may typically include an RF transmitter and an RF receiver such that an RF signal is developed across the path of the exit. When the tag passes through the RF signal (such tag not having been permissibly disabled in the case of the permanent or semi-permanent tag) an AC current will be induced in the inductor windings at the resonant frequency of the LC circuit. This current then causes a further RF signal to emanate from the inductor windings that will be received at the receiver of the detector. This further RF signal will be detected as a modulation of the primary RF signal developed by the transmitter of the detector. Upon detection of this modulation, an alarm can then be sounded.

A limitation and disadvantage of the above described EAS tags and systems is that detection of the attempted theft of the tag item does not occur until the item is already at the exit of the store. Absent an immediate security response upon the alarm being sounded, the perpetrator may readily leave the store with the tagged merchandise and evade apprehension.

Another disadvantage and limitation of the forgoing is that the theft protection provided thereby is relatively easy to defeat. For example, the key or decoupler required to remove the key lock of the removably attached tag may be possessed by one desirous to shoplift the item to which the tag is attached or by a dishonest employee who would otherwise have permissible possession of the key or decoupler. With the tag impermissibly removed from its item while in the retail store, the item can then be surreptitiously carried past the detector and from the store.

The permanently or semi-permanently attached tag, although it needs to be carried past the detector in an attempt to shoplift the item to which it is attached, is also relatively easy to defeat. In this case, the item need only be surreptitiously placed into a metal enclosure, such as a foil lined paper sack or a foil lined purse. The foil thus functions as an RF shield preventing the primary RF signal from the detector reaching the LC resonant circuit of the tag. Even if some RF energy does reach the tag through the foil shield, the tag would produce such a low level of RF output energy, if any, that any RF perturbation from the tag is most likely to be shielded by the foil shield. Accordingly, it is highly unlikely that any perturbation to the primary RF signal would be detected.

Variations to the foregoing EAS tags and systems are also known. For example, in U.S. Pat. No. 6,801,130, an EAS tag is designed to be placed on the packaging for the item in the manner such that the packaging cannot be opened until the tag is removed. The device that removes the tag is further enabled by a point-of-sale cash register only after the sale for such item has been recorded. However, unless such tag renders the item non-operative, or can only be impermissibly removed by causing damage to such item, such tag exhibits the same disadvantages and limitations of the EAS tags and systems described above.

A magnet circuit may also be used in such tags instead of a LC resonant circuit. For example, a magnetic EAS tag is described in U.S. Pat. No. 5,821,859, in which magnetic elements are closely spaced perpendicularly along an amorphous wire or strip. Each element, such as formed by magnetic ink, is magnetically saturated or left demagnetized. The magnetic elements thus form a binary code along the wire or strip, wherein such code may be used to provide a unique ID for the tag. The tag ID can be magnetically read at the point-of-sale for inventory control. The tag also contains a longer length of magnetic wire, which perturbs a magnetic field in a magnetic gate, also typically located in close proximity to the exit of a retail store to provide theft deterrence. However, such magnetic tag exhibits the same disadvantages and limitations as the RF EAS tags and systems described above.

A disadvantage and limitation of the above described magnetic EAS tag for inventory control is that manual intervention is required to read such tag. This manual intervention may occur at the point-of-sale, as described above, or by manually placing a magnetic reader next to each tag while in situ. The latter described method may be extremely laborious and time-consuming, or further subject to fraud by a dishonest employee.

A disadvantage and limitation common to of all of the above described EAS tags and systems is that such tags and systems relying upon detection of the tag when the tag crosses the boundary of the designated area. The detectors used in such systems define the boundaries of such area.

One prior art system to overcome this boundary condition is configured to detect a possible theft or other security breach while the tag is still within the designated area. For example, in U.S. Pat. No. 6,255,958, an active electronic tag includes a transmitting circuit configured to turn on when an attempt is made to remove the tag impermissibly from the item to which is attached. When turned on, the transmitter circuit transmits an RF signal that is conventionally detected to cause an alarm to sound. The system described in the '958 patent also includes a proximity sensor that detects when the tag is out of range of the sensor, which also causes the alarm to sound.

A disadvantage in limitation of the tag and system described in the '958 patent is that such system requires one proximity sensor to be placed relatively closely to each tag being monitored. Accordingly, such system is primarily useful for tagging stationery objects, such as artwork in the museum, and not for items of general merchandise that may be randomly and permissibly carried by consumers in the secure designated area of a retail establishment prior to check out.

One particular disadvantage and limitation that the above described EAS tags and systems do not address is when the tagged items need to be regularly moved between a stockroom and a display area within a retail store. For example, small expensive items such as gemstones, jewelry, watches and the like are typically removed from locked display cases during the hours the retail establishment is closed and placed in a vault or other secure stockroom. Since the boundary of the protected area is at the store exit, a theft occurring by a dishonest employee during the time the items are being removed from the display case may not be immediately detected. It is accordingly desirable that the boundaries between these different areas within the store are protected as well as the boundary at the exits of the store.

Accordingly, there exists a need to provide an EAS tag and system that overcomes one or more of the above described disadvantages and limitations. There exists a further need to provide an EAS tag and system that detects an attempt to conceal surreptitiously an EAS tag while such tag is being otherwise permissibly moved within the boundaries of a protected designated area. There it is still a further need to provide an EAS tag and system that facilitate inventory control without the need to read the tag at the point-of-sale or manually placing a reader next to each tag. There exists yet another need to provide an EAS tag and system that allows such tag to cross permissibly the boundaries of one or more designated areas. There exists still yet another need to provide an EAS tag and system that allows such tags to provide continuous protection while the tag is in transit between protected areas.

SUMMARY OF THE INVENTION

Therefore, it is a primary object of the present invention to provide an EAS tag and system that overcomes one or more of the above described disadvantages and limitations of the prior art. It is a further object of the present invention to provide an EAS tag and system that detects an attempt to conceal surreptitiously an EAS tag while such tag is being otherwise permissibly moved within the boundaries of a protected designated area. It is still a further object of the present invention provide an EAS tag and system that facilitate inventory control without the need to read the tag at the point-of-sale or manually placing a reader next to each tag. It is yet another object of the present invention to provide an EAS tag and system that allows such tag to cross permissibly the boundaries of one or more designated areas. It is a still yet another object of the present invention to provide an EAS tag and system that allows such tags to provide continuous protection while the tag is in transit between protected areas.

According to one embodiment of the present invention, an EAS tag polling system includes a plurality of EAS tags and a base station. Each of said tags is operative to transmit an acknowledgement having an identifying characteristic. The base station is also knowledgeable of the identifying characteristic of the acknowledgement transmitted from each one of the tags such that the base station is able to discriminate between each acknowledgment received and associate it to the tag from which it had been transmitted. In the broadest aspects of this embodiment of the present convention, the base station is operative to indicate that a positive response is associated with each of the tags from which the acknowledgement is received and a negative response is associated with each of the tags from which the acknowledgement is not received.

According to another embodiment of the present invention, an EAS tag polling system also includes a plurality of EAS tags and a base station. In this embodiment, the base station is operative to transmit a request to initiate a poll of the tags. In response to the request, each of the tags is operative to transmit an acknowledgment. Similarly as set forth above, the base station is further operative to indicate that a positive response is associated with each of the tags from which said acknowledgment is received and a negative response is associated with each of the tags for which the acknowledgment is not received.

A feature of the present invention, in either embodiment above, is at each tag acknowledges its presence to the base station while the tag is within the system resulting in a positive response. Any attempt to conceal surreptitiously anyone of the tags would then block the acknowledgment from reaching the base station, thereby resulting in a negative response for such tag. This feature advantageously allows an attempted theft of an item to which the tag is attached to be detected immediately upon attempted commission of the theft and not when the perpetrator has already passed through a detector located at the store exit.

Another advantage of the present invention is that the poll of tags in the system may also be used for real-time inventory control. In another embodiment of the present invention, a database may contain entries respecting each tag and the item of merchandise to which it is attached. The database changes as new items are brought into inventory and as other items are sold from inventory. A further advantage of the foregoing is that theft protection and inventory control may be provided simultaneously by the EAS tag polling system of the present invention.

These and other objects, advantages and features of the present invention will become readily apparent to those skilled in the art form a study of the following Description of the Exemplary Preferred Embodiments when read in conjunction with the attached Drawing and appended Claims.

DESCRIPTION OF THE PREFERRED EMBODIMENTS

Figure 1:
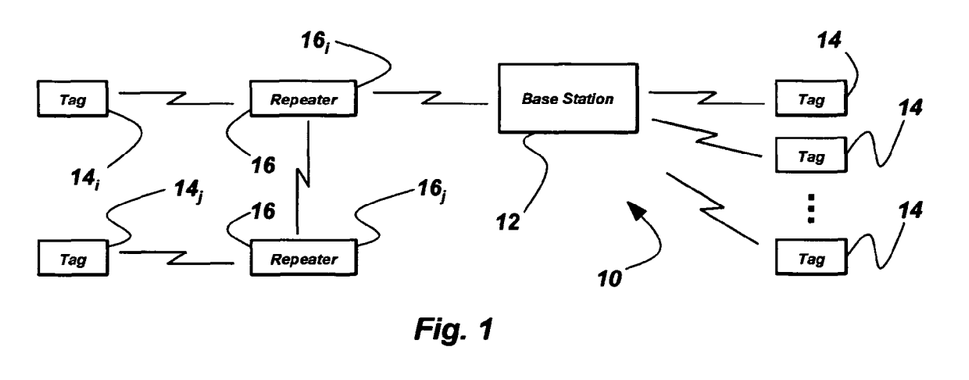
FIG. 1 is a schematic block diagram of an EAS tag polling system constructed according to the principles of the present invention.

Referring now to FIG. 1, an EAS tag polling system 10 includes a base station 12 and a plurality of EAS tags 14. Any one of known communication protocols may be used to establish wireless communications between the base station 12 and each of the tags 14 in a conventional manner. Exemplarily, such communications may occur in the radio frequency spectrum, although other electromagnetic spectrums such as infrared or microwave may also be used. In addition non-electromagnetic communications may be used, such as ultrasound communications.

In the event the transmission range of any of the tags 14 is insufficient to reach the base station 12, one or more conventional repeaters 16 may be placed interposed the base station 12 and any such one of the tags 14. For example the repeater $16_i$, may be interposed the base station 12 and the tag $14_i$ thereby extending the transmission range of the tag $14_i$ to the base station 12. Additional repeaters 16, such as the repeater $16_j$, may be cascaded as necessary to extend the transmission range of yet further ones of the tags 14, such as extending the transmission range of the tag $14_j$ to the base station 12.

Conversely, such repeaters 16 may also be used to extend the transmission range of the base station 12, as needed, to any one of the tags 14. Accordingly, any such repeater 16 may further be bidirectional such that communications may occur bidirectionally between the base station 12 and any one of the tags 14 wherein the transmission range of each is insufficient to reach the other.

As described in greater detail herein below, a poll of the tags 14 may be conducted passively or actively. In a passively conducted poll, the base station 12 merely "listens" for an acknowledgement transmitted from each of the tags 14. In contrast, in an actively conducted poll, the base station 12 initiates the poll of tags 14 by transmitting a request to which each of the tags 14 transmits and returns an acknowledgement to the base station 12.

It will also become apparent from the following description that the poll may be temporally conducted selectively on demand, intermittently, randomly, continuously or periodically. The poll of the tags 14, irrespective of its temporality, may, in addition to being a poll of all of the tags 14, be a poll of any particular ones or group of the tags 14, or even a single tag 14.

Moreover, the temporality of the poll conducted for one group of the tags 14 may be different from the temporality of the poll conducted for another group of the tags 14. For example, in a retail store the poll of tags attached to merchandise in consumer areas of the store may need to be conducted continuously or with a relatively short periodicity, whereas for tags attached to merchandise in a secure storeroom of such store, the poll may need only to be conducted intermittently or with a relatively long periodicity.

In both the actively and passively conducted poll, the base station 12 is operative to determine whether a positive response or a negative response is to be associated with each of the tags 14 as a result of the poll being conducted. A positive response associated with any tag 14 is minimally indicative that such tag 14 is present and normally operable within the system 10. For example, an acknowledgement, such as a frequency burst or pulse that otherwise conveys no information, would be minimally indicative that the tag 14 that transmitted such acknowledgement is present and operable. Conversely, a negative response associated with any tag 14 is minimally indicative that further action may need to be taken with respect to such tag 14. Any such further action, which is not to be construed as part of or limiting upon the present invention, may include the base station 12 being operative to generate conventional audio or visible indicia or alarms, or otherwise alert an operator of the system 10 to investigate the status of the tag 14 for which a negative response has been determined.

By default, a failure to receive an acknowledgement from any one of the tags 14 may be deemed a negative response for such tag 14. However, as described in greater detail hereinbelow, with respect to certain embodiments of the present invention, even if the base station 12 receives an acknowledgement from any one of the tags 14, such acknowledgement may contain an informational characteristic that fails verification at the base station 12 and therefore be deemed a negative response.

Generally, verification of the informational characteristic may be used to prevent spoofing of any tag 14 in the system 10. For example, should an attempt be made to conceal a surreptitiously tag 14 in a manner as described above, its acknowledgement would cease to be received at the base station 12. In the system 10, a negative response would be associated with such concealed tag 14 by default. To avoid such negative response and the detection of a potential theft from the further action that may ensue, a dummy tag would be introduced into the system 10 to spoof to conceal tag 14 by one attempting the theft. More particularly, the dummy tag would transmit a purported acknowledgement that would attempt to spoof the acknowledgement of the concealed tag 14 to make it appear to the base station 12 as if such tag 14 is still present and operable. However, as described below, the acknowledgement may have certain informational characteristics that are not predictable from observation but of which the base station is aware to verify such informational characteristics.

When the poll is conducted passively, each of the tags 14 is operative to transmit its acknowledgement. Furthermore, the acknowledgement transmitted from each one of the tags 14 has an identifying characteristic. The identifying characteristic, of which the base station 12 is knowledgeable, allows the base station to discriminate between each acknowledgement. The acknowledgement transmitted from each one of the tags 14 is transmitted commensurately with the temporality of the poll as described above. Also as described above, each of the tags 14 in one group may be operative to transmit its acknowledgment with a temporality different from the temporality of the acknowledgment transmitted from each of the tags 14 of another group.

In one embodiment of the present invention, the identifying characteristic may be a different code associated with the acknowledgement transmitted from each one of the tags 14. As is known in the art, this code allows the base station 12 to discriminate between each acknowledgement using code division multiple access (CDMA) protocols.

Alternatively, the identifying characteristic may be a different frequency associated with the acknowledgement transmitted from each one of the tags 14. Also is known the art, this frequency allows the base station 12 to discriminate between each acknowledgement using frequency division multiple access (FDMA) protocols.

Alternatively yet again, the identifying characteristic may be a different time slot for each acknowledgement transmitted from each one of the tags 14. As is well known in the art, the time slot allows the base station 12 to discriminate between each acknowledgement using time division multiple access (TDMA) protocols.

CDMA, FDMA and TDMA are well-known protocols for establishing communications between the base station 12 and each of the tags 14, and therefore the details of such protocols, and the details of the base station 12 and of the tags 14 necessary to implement such protocols, need not be further described. Of course, other, more basic, techniques for transmitting and receiving the acknowledgement and discriminating between each acknowledgment may also be used. For example, in lieu of such communication protocols, the identifying characteristic may be a key placed in the acknowledgment transmitted from each respective one of the tags. The key uniquely identifies each respective one of the tags 14, thereby allowing the base station 12 to discriminate between each acknowledgment. The key may be anyone of a tag ID, a standard address or any code base on the universal product code (UPC) standard that provides for unique identification of each one of the tags 14.

Figure 2:
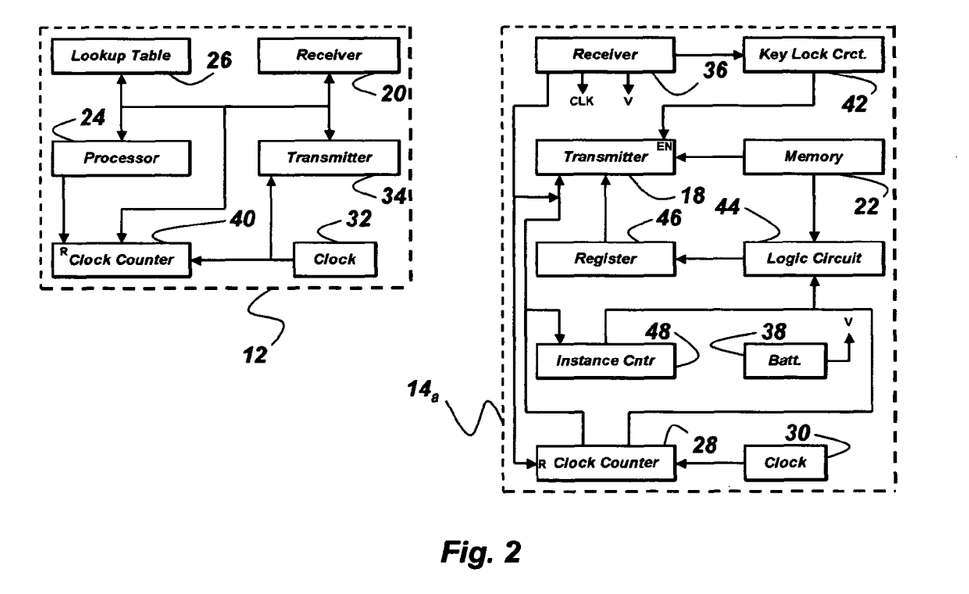
FIG. 2 is block diagram of an EAS tag constructed according to one embodiment of the present invention.

With further reference to FIG. 2, there is shown a detail of one embodiment of the base station 12 and an exemplary tag 14a, representative of one of the tags 14 of FIG. 1, useful to describe in greater detail several of the above features of the present invention. The tag 14a includes a transmitter 18, which is operative to transmit the acknowledgment from the tag 14a. The base station 12 includes a receiver 20, which is operative to receive the acknowledgment.

The tag 14a may further include a memory 22 in which the key unique to the tag 14a is stored. The memory 22 may be any of nonvolatile memory or flash memory. Alternatively, the key may also be hardwired or magnetically stored within the tag 14a. The key is applied to the transmitter 18, which transmits the acknowledgment with the key therein. Minimally, the acknowledgment transmitted need only be a transmission of the key itself.

To receive and read the key, the base station 12 further includes a processor 24. The acknowledgment from the tag 14a is received by the receiver 20, and the key read by the processor 24. The processor 24 may further access a lookup table 26 to ascertain whether the key received is one of the key entries corresponding to each respective one of the tags 14 in such lookup table 26. If so, the processor 24 may then set a flag or use any other indication that a positive response may be associated with such entry in the lookup table 26 and, therefore by extension, associated with the tag 14a.

When the temporality of the poll being conducted is periodic, for example, each of the tags is operative to transmit its respective acknowledgment periodically. Accordingly, each of the tags 14, as shown by the exemplary tag 14a, may further include a clock counter 28 having a plurality of output bits. As is known, the output bits of the clock counter 28 provide a binary count of the number of clock pulses applied to the clock counter 28.

The periodicity of the acknowledgment may be controlled by a selected one of the output bits of the clock counter 28. When such selected output bit transitions from a first binary state to a second binary state, such as from 0 to 1, a timing pulse may be conventionally developed from such transition and applied to the transmitter 18 of the tag 14a. In response to the timing pulse, the transmitter 18 is then operative to transmit the acknowledgment. The higher order the selected output bit is in the plurality of output bits, the greater the periodicity of the acknowledgment becomes.

When the selected one of the output bits of the clock counter 28 is the same in all of the tags 14, each one of the tags 14 will transmit its acknowledgment with the same periodicity as each other one of the tags 14. Accordingly, the selected one of the output bits may be different in each of the tags 14 for different periodicity in each of the tags 14, or the selected one of the output bits may be the same in one group of the tags 14 but different in another group of the tags 14 such that each group of the tags 14 has a different periodicity.

It should be readily apparent to those skilled in the art that two or more selected output bits of the tag clock counter 28 can also be logically combined such that the timing pulse is developed upon this logical combination changing state. Accordingly, from the output bits selected and the logical combination the timing pulse can have a periodic, an intermittent or a random temporality in all of the tags 14, were each group of the tags 14 can have its own temporality.

To develop the clock pulses, the tag 14a may include an internal clock 30, as best seen in FIG. 2, which applies the clock pulses it develops to the clock counter 28. However, to provide for a minimal size of the tags 14, the clock pulses may be developed at the base station 12 and transmitted to the tag 14a. Accordingly, as best seen in FIG. 2, the exemplary base station 12 may further include a clock 32 and a base station transmitter 34. The base station transmitter 34 would then transmit the succession of clock pulses developed by the base station clock 32. Furthermore, each of the tags 14, as seen in the exemplary tag 14a, further includes a tag receiver 36, which receives the succession of clock pulses for application to the clock counter 28.

To provide power to the tag transmitter 18, the memory 22, the clock counter 28, the tag clock 30 (if used) and the tag receiver 36, each of the tags 14, as seen in the exemplary tag 14a, may also include an internal battery 38. Again to provide for a minimal size of the tag 14a, the power for the tag 14a may be transmitted to the tag 14a by the base station 12. As is known, RF energy received at the tags 14 can be converted to DC power, such as by the tag receiver 36 of the exemplary tag 14a, as best seen in FIG. 2. This RF energy may also be derived from an RF carrier used for the clock pulses developed by the base station clock 32.

Alternatively to using the tag clock counter 28 as above described to control the temporality of the acknowledgments transmitted from each one of the tags 14, the base station 12 may further be operative to transmit a sync pulse. Accordingly, the base station 12 may further include a clock counter 40. Similarly as described with reference to the above described tag clock counter 28, the output bits of the base station clock counter 40 provide a binary count of the number of clock pulses applied to it by the base station clock 32.

Also similarly as described above, the periodicity of the sync pulse may be controlled by a selected one of the output bits of the base station clock counter 40. When a selected output bit of the base station clock counter 40 transitions from a first binary state to a second binary state, such as from 0 to 1, the sync pulse may be developed from such transition and applied to the base station transmitter 34 to be transmitted to the tags 14. Alternatively, two or more selected output bits of the base station clock counter 40 may also be logically combined such that the sync pulse has an intermittent or random temporality. It is to be noted that the processor 24 may also develop sync pulse in accordance with its software.

Each of the tags 14 may then be further responsive to the sync pulse to transmit its acknowledgement. In the exemplary tag 14*a*, the sync pulse is received by the tag receiver 36 and the sync pulse, which now functions as the above described timing pulse, is applied to the tag transmitter 18. The tag transmitter 18 then transmits the acknowledgment in response to the sync pulse.

Furthermore, each of the tags 14 may be operative to transmit its acknowledgement after a selected time delay from receipt of the sync pulse. The time delay for each of the tag 14 is selected such that the acknowledgement transmitted from each of the tags 14 is received in succession at the base station 12 so that the base station 12 if discrimination between the acknowledgement received from each one of the tags 14 is not otherwise completely ascertainable by the informational characteristic in each acknowledgment. It is to be understood that the base station 12 could employ other known means to enable such discrimination thereby obviating the successive nature of the receipt of each acknowledgement.

For example, when the sync pulse transmitted by the base station 12 is received at the exemplary tag 14*a*, instead of the tag receiver 36 applying the sync pulse to the tag transmitter 18 the sync pulse is applied to a reset input (R) of the tag clock counter 28. Similarly as described above, the timing pulse is developed at a selected output bit of the tag clock counter 28 when such output bit transitions from the first binary state to the second binary state. The time delay is accordingly commensurate with the number of clock pulses counted by the tag clock counter 28 subsequently to the sync pulse being applied to its reset input. So that each of the tags 14 has a different time delay from receipt of the sync pulse to transmission of its acknowledgment, the selected output bit of the tag clock counter 28 at which the timing pulse is developed would be different in each of the tags 14.

As set forth above, receipt by the base station 12 of the acknowledgement from any one of the tags 14 is minimally indicative that such tag 14 is present and normally operable within the system 10, and that a positive response may be associated with such tag 14. Furthermore, after the positive response has been associated with such tag 14, the base station 12 may be further operative to determine that a negative response is to be associated with such tag 14 in the event its acknowledgement ceases to be received by the base station 12.

Exemplarily, when each of the tags 14 is operative to transmit periodically its acknowledgement, the negative response may be associated with such tag 14 upon expiration of a selected time duration from last receipt of the acknowledgement transmitted from such tag 14 from which a positive response has been determined. The selected time duration may be commensurate with a periodicity of the acknowledgement. For any other temporality described above, the selected time duration is of course commensurate with such temporality.

Furthermore, prior to the negative response being associated with such tag 14 from which the acknowledgement has ceased to be received, the base station 12 may further operative to transmit a request to such tag 14 which can be generally construed in this exemplary embodiment as a prompt for such tag 14 to retransmit its acknowledgement. Since in this embodiment the request is specifically directed to a particular tag 14 from which the acknowledgement has not been received, the request may utilize the same identifying characteristic of the acknowledgement that would otherwise have been transmitted from such tag 14 such that the request is directed only to such tag 14.

Generally, in response to the request such tag 14 may then be operative to retransmit its acknowledgement. The base station 12 may then be further operative to indicate that a positive response is associated with such tag 14 in the event the base station 12 receives a retransmitted acknowledgement following the request or that a negative response is associated with such tag 14 in the event the base station 12 does not receive a retransmitted acknowledgement following the request.

As stated above, the request to one of the tags 14 uses the same identifying characteristic as would be in the acknowledgement from such tag 14. The tag 14 to which the request is sent may verify that the identifying characteristic in the request is the same identifying characteristic in the acknowledgment transmitted from such tag 14. Only upon such verification would such tag 14 be operative to retransmit its acknowledgment. Such identifying characteristic would inherently be part of the request under any one of the above identified communication protocols, as is known in the art.

For example, if the identifying characteristic is the key uniquely identifying such tag 14 placed in the acknowledgment as above described, the request for such tag 14 would then also include this key. Since each of the tags 14 may detect the request, to avoid any other one of the tags 14 responding to the request the tag 14 to which the request is to be directed would then be then further operative to verify the key and to retransmit its acknowledgment only in the event the key is verified.

To illustrate the foregoing embodiment of the present invention, with reference again to FIG. 2, the processor 24 has previously set a flag to indicate that a positive response has been associated in accordance with the acknowledgment received from the tag 14*a*. At the time of setting the flag, the processor 24 may also start a timer, such as applying a reset pulse to a reset input (R) of the base station clock counter 40 or, in the event such counter 40 is being used for controlling the periodicity of a sync signal if such sync signal is being utilized, to another counter similar to the base station counter 40 dedicated to the timer function in the base station 12. Expiration of the timer, when a selected one of the output bits of the base station clock counter 40 changes state, indicates that the acknowledgment from the tag 14*a* has ceased to be received.

When the selected one of the output bits of the base station counter 40, or other such counter, transitions from the first binary state to the second binary state the processor 24 may then be responsive to the second state to remove the flag, thereby indicating that a negative response is now to be associated with the tag 14*a*. In the event a request to retransmit the acknowledgment is to be sent to the tag 14*a* to retransmit its acknowledgment, instead of the flag of being immediately removed, the processor 24 may instead develop the request to be transmitted to the tag 14*a* in response to the selected one of the output bits transitioning to the second state. If a retransmitted acknowledgment is received, the flag will be maintained in the processor will apply another reset pulse to the reset input (R) of the base station clock counter 40. However, if a retransmitted acknowledgment is not received, the flag will be removed by the processor 24.

Should the request to be sent to the tag 14*a* require the key associated with this tag, the processor 24 may access the lookup table 26 to read the key associated with the flag and accordingly associated with the tag 14*a*. The processor 24 may then apply the key to the base station transmitter 34 to transmit the request including the key. Minimally, such key is the request.

To verify the key, the tag 14a further includes a key lock circuit 42. The tag receiver 36 is operative to receive the request and to apply the key contained therein to the key lock circuit 42. The key lock circuit 42 is operative to verify the key, as is well known in the art. The tag transmitter 18, in response to the key being verified, is an operative retransmit the acknowledgment. For example, an output of the key lock circuit 42 can change state and this state change applied to an enable (EN) input of the tag transmitter 18.

The key may be any of the keys as described above. Furthermore, the key may also be one of a plurality of keys derived from a master key or from the standard address for one of the tags 14. Exemplarily, the master key or standard address for each one of the tags 14 may be represented by an originating bit string having a known length. It is mathematically known that from the originating bit string of the master key or standard address there exists a plurality of other bit strings that may be derived from the originating bit string. Each of these other bit strings can in turn be decoded by the key lock circuit or address decoder into the originating bit string for the master key or the standard address, which in turn may then be verified.

It is to be noted and it should apparent from the description set forth immediately that the request with a key identifying a particular one of the tags 14 can also be transmitted from the base station 12 at any time for any purpose. Accordingly the transmission of the request from the base station 12 is not limited to the embodiment wherein an acknowledgement has failed to be received. For example, the request can be selectively transmitted when a poll of one, some or all of the tags 14 is desired on demand. For example, the key can be unique to each of the tags 14, or common to one group of the tags 14 with another key common to another group of the tags 14. The request can also have any desired temporality described above.

From the description above of various embodiments of the present invention, it is seen that a poll can be primarily conducted passively yet have some of the aspects of active polling, such as a request on demand at anytime to any one or more of the tags 14. Furthermore with respect to one group of the tags 14 the poll may be conducted primarily passively yet with another group of the tags 14 the poll may be conducted primarily actively. In these embodiments above described embodiments, whether such poll is conducted passively without any request or is conducted actively by including a request with some temporality, the acknowledgment transmitted from each one of the tags 14 has had an identifying characteristic by which the base station 12 has been able to discriminate between the acknowledgment received from each of the tags 14. It is to be understood that in a poll conducted purely actively, as described further below in yet another embodiment of the present invention, the acknowledgment transmitted from each one of the tags 14 need not have any identifying characteristic.

In another embodiment of the present invention, the acknowledgement transmitted from each of the tags 14 may have one or more informational characteristics from which the base station 12 may use in its determination of whether a positive or negative response should be associated with any one of the tags 14. Generally, the base station 12 is knowledgeable of the informational characteristic of the acknowledgment received from each one of the tags 14. For each acknowledgement received, the base station 12 may then be further operative to determine the positive response is associated with each of said tags 14 for which the informational characteristic of its acknowledgement is valid and the negative response is associated with each of the tags for which its informational characteristic of said acknowledgement is invalid.

For example, the informational characteristic may be data content of each acknowledgement. The base station 12 would then be further operative to verify the data content in the acknowledgement received from each one of the tags 14 such that when verified the positive response is determined to be associated with each respective one of the tags 14 and when not verified the negative response is determined to be associated with each respective one of the tags 14. Verification can be accomplished in a manner appropriate for the nature of the data content. Such verification may include, but is not limited to, pattern recognition of a bit string, computing of value of expected data content and comparing such value to the value of the data content in the received acknowledgment, and computing checksums or CRC values to be transmitted with such data content in the acknowledgment.

In the acknowledgment transmitted from each of the tags 14, the data content may be identical for each acknowledgment transmitted from all of the tags 14, or may be different for the acknowledgment transmitted from each one of the tags 14. The data content, irrespective of whether it is identical or different for each acknowledgment may further be invariant in each subsequent acknowledgment transmitted from each one of the tags 14. For example such invariant data content may be a preselected bit string that does not otherwise convey any information other than its bit pattern. Recognition by the base station 12 of this pattern in an acknowledgment received from one of the tags 14 would accordingly result in such pattern being verify and therefore in a positive response being associated with such tag 14.

Alternatively, the data content may further be variant in each subsequent acknowledgment transmitted from each one of the tags 14 in accordance with a function that implements an algorithm. In such embodiment, the base station 12 is further knowledgeable of such algorithm and hence the variance imposed by the algorithm such that the data content can be verified at the base station 12. For example, as described in greater detail below, the variance can be manifested through the resultant value of data obtained upon a seed being processed in accordance with such algorithm in each of the tags 14 to derive the data content for the acknowledgment and 10 the base station 12 to derive expected data content such that when an acknowledgment is received the base station 12 can compare the data content of such acknowledgment to the expected data content. Accordingly, a positive response may be associated with each of the tags 14 for which the comparison is positive and a negative response associated with each of the tags 14 for which the comparison is negative. Various algorithms may be selected or developed for the variant data content.

Exemplarily of two particular functions, the data content may be variant as a function of time or variant as a function of the number of instances that an acknowledgment is transmitted from each one of the tags 14. The algorithm for either of these functions can start with the value of a seed, wherein the seed is used by the algorithm to develop the data content in accordance with such function. For example, the seed could be an initialized bit string. The algorithm that processes the seed as a function of time or instances to develop the data content for the acknowledgment to be transmitted. Similarly, the base station, being knowledgeable of the value of the seed, will also process the seed to develop the expected data content for verification.

With reference returning to FIG. 2, the exemplary tag 14a, in order to implement an algorithm as a function of time, may further include a logic circuit 44, in addition to the above described memory 22 and tag clock counter 28. In this instance, the memory 22 stores the seed. If a key is also to be stored in the tag 14a, a further memory needs to be provided to store either the key or the seed. The tag clock counter 28, as described above, has a succession of clock pulses applied thereto such that a count of the clock pulses is developed at its output bits. The clock pulses may be developed either by the tag clock 30 or the base station clock 32, as hereinabove described.

The seed and at least one output bit of the count developed by the tag clock counter 28 are applied to the logic circuit 44 to develop an output bit string wherein such output bit string is the data content for the acknowledgment developed as a function of time to be transmitted from the tag 14a. Accordingly, the output bit string may then be bitwise applied to the tag transmitter 18. The tag transmitter 18 in turn is operative continuously or in response to the above described timing pulse to transmit the acknowledgment with the data content developed as a function of time contained therein. A register 46 may be used wherein the output bit string from the logic circuit 44 is serially clocked into the register 46 and upon the above described timing pulse being developed the current contents of the register 46 is applied to the tag transmitter 18 in response to the timing pulse.

The logic circuit 44 may be an implementation of any desired logic with which to combine the seed in the memory 22 and one or more selected output bits of the tag clock counter 28. For example, when the seed is a bit string stored in the memory 22 each output bit of the memory 22 may be combined with a corresponding output bit of the tag clock counter 28 using an exclusive-or function. The actual logic used in the logic circuit 44 depends on the level of security desired for the system 10. More complex logic may be accordingly implemented to combine the seed with one or more selected output bits of the tag clock counter 28.

If it is desired to prevent spoofing of the acknowledgment transmitted by the tags 14, it is important that the data content contained within the acknowledgment is not predictable from observation. Thus, the one or more output bits of the tag clock counter 28 selected to be combined with the seed by the logic circuit 44 may result in an input bit string to the logic circuit 44 that changes at every clock pulse or after a selected number of clock pulses depending on the lowest order bit selected. Accordingly, the output bit string developed by the logic circuit 44 could also change at every clock pulse, after any selected number of such clock pulses, or even randomly with respect to the number of clock pulses.

Thus, the one or more output bits of the tag clock counter 28, which are selected to be logically combined with the seed, and the logic implemented by the logic circuit 44 define the algorithm implemented by the tag 14a. Note that this algorithm need not be the same in each of the tags 14. In any event, the base station 12 must also be knowledgeable of the algorithm implemented in the tag 14a such that the data content in the acknowledgment received from the tag 14a can be verified. Accordingly, the value of the seed stored in the memory 22 may be further contained in the lookup table 26 and associated with the tag 14a. Such association may be with respect to the identifying characteristic of the acknowledgment transmitted from the tag 14a. For example, if a key is used as the identifying characteristic, the seed may be reference to the key for the tag 14a.

The processor 24 may then be programmed to implement the same algorithm as implemented by the tag clock counter 28 and the logic circuit 44, or the base station 12 may also include a logic circuit (not shown) identical to the logic circuit 44 to implement the algorithm in the base station 12. In either event, the result of combining using the algorithm the seed in the lookup table 26 corresponding to the tag 14a with an equivalent value to the selected output bits of the tag clock counter 28 will result in an expected data content being developed in the base station 12 such that the data content in the acknowledgment received from the tag 14a can be verified. For example, the processor 24 may compare the data content in the acknowledgment received from the tag 14a to the expected data content developed in the base station 12. If both items of data match, then the data content has been verified and a positive response may then the associated with the tag 14a. If both items fail to match, then the data content is not verified and a negative response may then being associated with the tag 14a.

The equivalent value of the selected output bits of the tag clock counter 28 used by the processor 24 may be obtained from the same output bits of the base station clock counter 40. However, it may be necessary to synchronize the clock count output from each of the tag clock counter 28 and the base station clock counter 40 so that both of the clock count values are identical when logically combined with the seed. Accordingly, the base station 12 may further be operative to develop a reset pulse to reset simultaneously the tag clock counter 28 and the base station clock counter 40.

In particular, the reset pulse may be developed by the processor 24. The reset pulse in the base station 12 is then applied to the reset input (R) of the base station clock counter 40 and also to the base station transmitter 34. The base station transmitter 34 in turn transmits the reset pulse to the tag 14a whereat it is received by the tag receiver 36. The tag receiver 36 then applies to reset pulse to the reset input (R) of the tag clock counter 28.

When both the tag clock counter 28 and the base station clock counter 40 are so used, it may be preferable that the clock pulses used in the tag 14a be obtained from the base station clock 32 and transmitted by the base station 12 so that each of the tag clock counter 28 and the base station clock counter 40 operate in lockstep following reset. Furthermore, the processor 24 would also know from such lockstep operation upon which clock pulse the timing pulse, as hereinabove described, is developed. Accordingly, the contents of the register 46 when the timing pulse is applied thereto can be dynamically computed in real time at the base station 12 by the processor 24 to develop the expected data content.

Alternatively, instead of relying upon synchronization of the tag clock counter 28 and the base station clock counter 40 to provide the processor 24 with an equivalent value of the selected output bits of the tag clock counter 28, upon the timing pulse being developed the current value of the selected output bits or all of the output bits of the tag counter 28 may be added, such as prepended or appended, to the contents of the register 46. The data content of the acknowledgment transmitted by the tag 14a would then contain both the selected output bits of the tag clock counter 28 and the contents of the register 46. When the processor 24 reach the data content from the received acknowledgment, it can extract the time information therefrom.

The exemplary tag 14a, in order to implement an algorithm as a function of a number of instance that the acknowledgement has been transmitted may further include an instance counter 48, in addition to the memory 22, the tag clock counter 28 and the logic circuit 44. The instance counter 48 develops of binary count of the number of instances that the acknowledgment has been transmitted from the tag 14a. As described above, the memory 22 stores the seed and the tag clock counter 28 develops a count of clock pulses provided by either the tag clock 30 or the base station clock 32.

In contrast to the time function described above, at least one of the output bits of the count developed by the instance counter 48 are applied along with the seed from the memory 22 to the logic circuit 44. Similarly as described above, the logic circuit 44 develops an output bit string to be applied bitwise to the tag transmitter 18. In this embodiment the output bit string is data content for the acknowledgment developed as a function of the number of instances that the acknowledgment has been transmitted from the tag 14a. To increment the instance counter 48 upon each transmission of the acknowledgment, the above described timing pulse is applied to the instance counter 48 in addition to the timing pulse being applied to the tag transmitter 18. Moreover, the output bit string from the logic circuit 44 may also be clocked into the register 46 and the contents of the register 46 applied to the tag transmitter 18 in response to the timing pulse.

Again, the logic circuit 44 may be an implementation of any desired logic with which to combine the seed in the memory 22 and the at least one of the output bits of the instance counter 48. Also, one or more bits of the count developed by the instance counter 48 can be logically combined by the logic circuit 44 with the seed further to make changes in the resultant output bit string from the logic circuit 44 unpredictable to an observer upon each transmission of the acknowledgment.

Similarly as described above, the base station 12 must be knowledgeable of the algorithm implemented by the logic circuit 44. The processor 24 may be programmed to implement the same algorithm of the logic circuit 44 using a value of the seed from the lookup table 26 and the equivalent output bits from the instance counter 48. Note that the algorithm need not be the same in each of the tags 14. Otherwise, the base station 12 would otherwise be to include its own instance counter (not shown) similar to the instance counter 48. Verification of the data content in the received acknowledgment to the value of such data developed in the base station 12 is identical as described above. The reset pulse developed by the processor 24 may also be applied, in this embodiment, to the instance counter 48 such that the count of the output bits of the instance counter 48 can be predicted at the base station 12. In particular, the predicted value can be used by the processor 24 in implementing the algorithm to develop the expected data content.

It is seen from the above embodiments that the data content in the acknowledgment transmitted from one of the tags 14 can be developed from the city as various functions of time or the number of instances that the acknowledgment has been transmitted such that the data content appears to an observer to randomly change in each transmission of the acknowledgment or after several or many successive transmissions of the acknowledgment from anyone of the tags 14. The base station 12 being knowledgeable of the algorithm implemented and the seed used by such function is then able to compare the data content in the received acknowledgment from each one of the tags 14 to an expected value determined dynamically within the base station 12. A positive comparison thus results in a positive response being associated with one of the tags 14 from which the acknowledgment is received, whereas a negative comparison accordingly results in a negative response being associated with such tag 14.

In yet another embodiment of the present invention, the data content in the acknowledgment received from each one of the tags 14 may be variant in accordance with a function in accordance with an algorithm implemented in each one of tags 14. As described above, the base station 12 is also knowledgeable of this function. The algorithm implemented in each one of the tags 14 may be the same in all of the tags 14, the same in one group of the tags 14 but different from the algorithm in another group of the tags 14, or even different in each one of the tags 14.

Similarly to the above embodiments, the function may rely upon a seed stored in the memory 22 with the data content changing in each successive transmission of the acknowledgment from each one of the tags 14 in accordance with the algorithm implemented in each one of the tags 14. Accordingly, observation of the acknowledgment transmitted from each tag 14 may not allow an observer to predict the data content from one such tag 14, and, furthermore, when the algorithm implemented in each one of the tags 14 is different from the algorithm in each other one of the tags 14, there is no common pattern that can be observed among the acknowledgments transmitted from different ones of the tags 14.

For even greater security, the said base station 12 may be further operative to transmit a request, wherein the request includes an informational characteristic, and each one of said tags 14 may be further operative to develop the informational characteristic of the acknowledgement transmitted from each one of the tags 14 as a function of said informational characteristic of the request. In a particular example, the base station 12 may transmit a request to each of the tags 14 wherein the request also includes data content that is used as the seed for the algorithm in each of the tags 14 thereby obviating the necessity for any such seed being stored in the memory 22. The request can either be a single request to which all of the tags 14 respond, or an individual request for each respective one of the tags 14, or a request for a group of the tags 14. In any event. each of the tags 14 in response to any such request is operative to develop the data content of its acknowledgment as the function of the data content of the request. When the request includes data content, the algorithm implemented in each of the tags 14 by which the acknowledgment data content is developed as a function of the request data content can also be the same in all of the tags 14, different in each one of the tags 14, or the same in one group of the tags 14 but different from the algorithm in another group of the tags 14.

Figure 3:
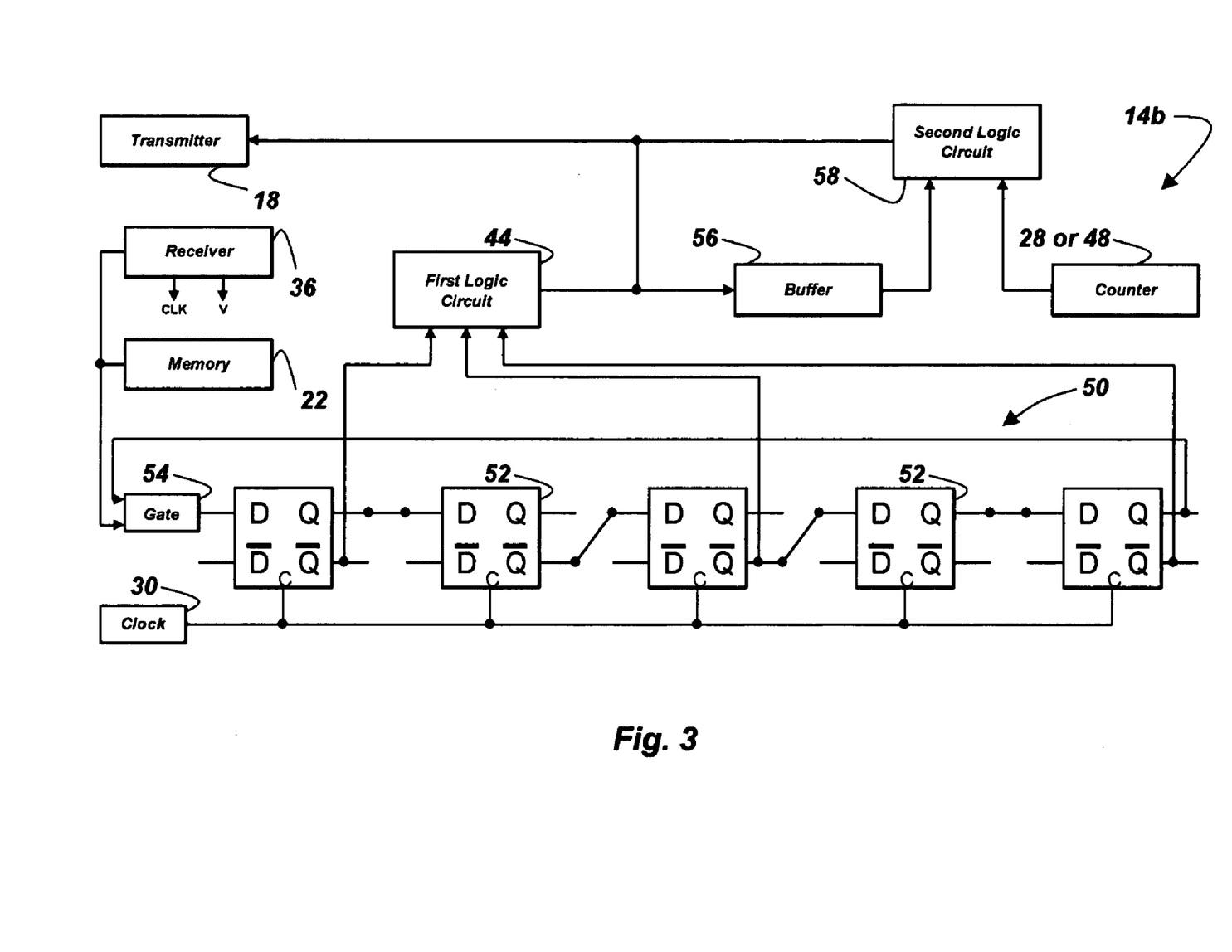
FIG. 3 is block diagram of an EAS tag constructed according to another embodiment of the present invention.

With reference now to FIG. 3, there is shown an exemplary tag 14b, representative of the tags 14 of FIG. 1, in which an exemplary algorithm is implemented such that the acknowledgment data content developed in each of the tags 14 as a function of a seed stored in the memory 22 or the request data content. The tag 14b may include an n-bit wide shift register 50, and the tag receiver 36 and the first logic circuit 44 as described above. If the seed is to be stored in the tag 14a, the memory 22 may also be used. The n-bit wide shift register 50 has a plurality of cascaded gates 52. Each of the cascaded gates 52 has Q output and $\overline{Q}$ output. The logic circuit 44 has a plurality of inputs and output. Each of the inputs of the combinational logic circuit 44 is connected to a selected one of the Q output and the $\overline{Q}$ output of a corresponding one of the gates 52.

As best seen in FIG. 3, the number of the inputs to the logic circuit 44 may further be less than the number of the gates 52 in the shift register 50. Furthermore, each of the gates 52 further has a D input. The D input of each one of the gates 52 is connected to a selected one of the Q output and the $\overline{Q}$ output of immediately preceding one of the gates 52. The unique function provided in each of the tags 14 is determined by the connection between one of the inputs and the selected one of the Q output and the $\overline{Q}$ output of the corresponding one of the gates 52, and further by the connection between the D input of each one of the gates 52 and the selected one of the Q output and the $\overline{Q}$ output of immediately preceding one of the gates 52.

If in all of the tags 14 the above described connections between the shift register 50 and the logic circuit 44 and further between each of the gates 52 within the shift register 50 are identically configured, then the algorithm by which the acknowledgment data is developed as a function of the seed is identical in all of the tags 14. If in no two of the tags 14 the above described connections between the shift register 50 and the logic circuit 44 and further between each of the gates 52 within the shift register 50 are identically configured, then the algorithm by which the acknowledgment data is developed as a function of the seed is different in each of the tags 14. Moreover, the above described connections in one group of the tags 14 may be identical but different from such connections in another group of the tags 14.

If the seed comes from the data content of the request, the tag receiver 36 upon receiving the request applies the data content of the request as a bit string to the shift register 50. The bit string representing the seed, either from the memory 22 or from the data content of the request, is bitwise clocked into the shift register 50. Accordingly, the tag 14b may further include the tag clock 30 to develop internally the clock pulses, or such clock pulses may be developed by the base station clock 32 and transmitted from the base station 12 to the tag 14b, each as described above. As the seed is bitwise clocked into the shift register 50, the logic circuit 44 is also clocked such that at each clock pulse, the present state of the Q output and the $\overline{Q}$ output of the gates 52, which are connected to the inputs of the logic circuit 44, are processed by the logic circuit 44 to develop each bit of the output bit string. The output bit string is then bitwise applied at each clock pulse to the tag transmitter 18 to be transmitted as the acknowledgment data content.

When the seed is bitwise clocked into the shift register 50, each bit thereof may further be logically combined, such as with the standard gate 54, with an output bit from the Q output or the $\overline{Q}$ output the least significant one of the gates 52. Since it is contemplated that the number of bits in the seed is far greater than the number of gates 52, the effect of combining each bit of the seed with the output bit of the least significant one of the gates 52 has the effect of randomizing the input to the logic circuit 44, especially when the number of bits of the seed is not an integer multiple of the number of gates 52, to make the acknowledgment data content less predictable by observation. The standard gate 54 may be any one of AND, OR or EX-OR gates. Note that when the seed is provided by the request data content, the seed may also change in each instance of the request, or change intermittently or randomly after several instances of the request to make the acknowledgment data content even less predictable by observation.

To further reduce predictability of the acknowledgment data content, the output bit string developed by the logic circuit 44 may further be logically combined with the clock count or an instance count similarly as described above. In such embodiment, the tag 14b may further include a buffer 56 and a second logic circuit 58. The buffer 56 temporarily stores the output bit string from the logic circuit 44. The tag 14b would also include the tag clock counter 28, if the contents of the buffer 56 are to be combined with the output bits of a clock count, or the instance counter 48, it contents of the buffer 56 are to be combined with the output bits of an instance count. In either event, the contents of the buffer 56 and one of the tag clock counter 28 or instance counter 48 are applied to the second logic circuit 58. The second logic circuit 58 then develops an output bit string, which may then be bitwise applied to the tag transmitter 18 as the acknowledgment data content to be transmitted in the acknowledgment from the tag 14b.

Again, the first logic circuit 44 and the second logic circuit 58 may be an implementation of any desired logic with which to combine the state of the Q output and the $\overline{Q}$ output of the gates 52 and the output of the first logic circuit 44 with the either the tag clock counter 28 or the instance counter 48, respectively. As described above, one or more bits of the count developed by the tag clock counter 28 or the instance counter 48 can be logically combined by the second logic circuit 58 with the output bit string from the first logic circuit 44 to make changes in the resultant output bit string from the second logic circuit 58 yet even further unpredictable to an observer upon each transmission of the acknowledgment.

Similarly as described above, the base station 12 must be knowledgeable of the algorithm implemented by the shift register 50, and the logic circuit 44, as well as the second logic circuit 54 and with either of the tag clock counter 28 or the instance counter 48, if present. The processor 24 may be programmed to implement the this algorithm using the seed for the tag 14b, as well as each other of the tags 14 if such data content is different. Otherwise, the base station 12 would otherwise need to include its identical elements (not shown) as shown in the tag 14b of FIG. 3.

Verification of the data content in the received acknowledgment to the value of such data developed in the base station 12 is identical as described above, for example by comparing the received data content in the acknowledgement read by the processor 24 to the expected data dynamically developed by the processor 24. The reset pulse developed by the processor 24 may also be applied, in this embodiment, to a reset input (R) of each of the elements of the tag 14b for reasons as above described.

As generally described above, when the poll of the tags 14 is conducted actively, the base station 12 is operative to transmit the request to the tags 14 and at least one of the tags 14 is then operative to transmit its acknowledgment in response to the request. The request is transmitted commensurately with the desired temporal nature of the actively conducted poll. Alternatively to only one of the tags 14 being operative to transmit its acknowledgement in response to the request, all of the tags 14, or particular ones or group of the tags 14 may be operative to transmit its acknowledgement in response to the request.

It is to be particularly noted that when the poll is conducted actively the acknowledgement transmitted from each of the tags 14 does not require, but may otherwise have as in the other embodiments described above, an identifying characteristic similarly as described above with respect to the acknowledgement transmitted by the tags 14 when the poll is conducted passively. Without any such identifying characteristic in the acknowledgment, the request transmitted from the base station 12 may include an identifying characteristic uniquely identifying a particular one of the tags 14 from which an acknowledgment is requested. Accordingly, only this particular one of the tags 14 within the system 10 is operative to transmit its acknowledgment.

It is to be understood that the identifying characteristic in the request transmitted by the base station 12 typically is, but need not be a key or other identifier, as described above. It is contemplated that the request when transmitted can be pointed to a particular one of the tags 14 such that no other one of the tags 14 receives the same request. Accordingly, the directional information becomes the identifying characteristic. Such transmission techniques are well-known in the art for RF, microwave, optical and infrared communication technologies, among others. In such event, the particular one of the tags 14 receiving such request need only reflect such request, also using known technologies. The reflected request would then be the acknowledgment transmitted from such tag 14.

When the request contains an identifying characteristic uniquely identifying each one of the tags 14, such as the above described key and each of the tags 14 having the key lock circuit 42, the base station 12 may be operative to transmit the request for each respective one of the tags 14 as a succession of requests. In absence of any identifying characteristic in the acknowledgment from each one of the tags 14, the base station 12, in order to discriminate between each acknowledgment received, may further be operative to transmit each request after or in response to receipt of the acknowledgment transmitted from one of the tags 14 in response to immediately prior request in the succession of requests.

Furthermore, the base station 12 may be operative to transmit each request upon expiration of a selected time duration in the event the acknowledgment from another one of the tags 14 is not received in response to the immediately prior request. Furthermore, the base station 12 may also be operative to resend the request to anyone of the tags 14 upon expiration of a selected time duration in the event the acknowledgment from such one of the tags 14 has not been received.

Exemplarily, the processor 24 may obtain a key corresponding to one of the tags 14 from the lookup table 26 and apply such key to the base station transmitters 34 to transmit the request similarly as described above. Upon transmission of the request to such tag 14, the processor may also set a timer by applying a reset pulse to the reset input (R) of the base station clock counter 40. Upon receipt of the acknowledgment from such tag 14, the processor 24 may set the flag as described above and also obtain the next key from the lookup table 26 such that the next request in the succession may be transmitted in the manner described above. However, if the acknowledgment from such tag 14 were not received prior to the timer expiring, the processor 24 would remove the flag associated with such tag 14 or send a further request to such tag 14 to request a retransmission of the acknowledgment prior to removing the flag, each event having been described above. In either event, should the processor 24 remove the flag associated with such tag 14, the processor 24 will also obtain the next key from the lookup table 26 for the next request in the succession.

Subject to the above constraint wherein the acknowledgment from each of the tags 14 does not contain an identifying characteristic, each of the above described embodiments of the tags 14, in reference to FIGS. 2 and 3, may be used in the presently described embodiment of the actively conducted poll. For example, the acknowledgment from each of the tags 14 may have data content as described above developed as a function of time, a function of instances, or as a function of a seed stored within each tags 14 or sent as data content in the request. It can also be seen that as the base station 12 dynamically generates the expected data content to compare to the received data content in an acknowledgment, since such data is unique each of the tags 14 in which such data content has been developed, such data content may further identify the tags 14 from which it had been transmitted.

There has been described herein above exemplary preferred embodiments of an EAS tag polling system. Those skilled in the art may now make numerous uses of, and departures from, the above described embodiments without departing from the inventive concepts disclosed herein. Accordingly, the present invention is to be defined solely by the lawfully permitted scope of the appended Claims.

The invention claimed is:

1. A system for electronic article surveillance, the system comprising:
    a base station and a plurality of active RF tags being operable to attach to articles under surveillance,
    wherein each of said RF tags being operative to repeatedly initiate, independently from other tags and the base station, an unsolicited radio transmission of a signal having a unique identifying characteristic of said RF tag; and
    wherein the base station comprises
        a receiver operative to receive a radio transmission from a RF tag,
        a memory operative to store a lookup table containing a plurality of key entries corresponding to each of the plurality of RF tags, and
        a processor operably coupled to the receiver and to the memory, the processor being operative to obtain from the received radio transmission an identifying characteristic of an RF tag and to determine whether said identifying characteristic corresponds to one of the key entries in the lookup table, wherein, in the event said identifying characteristic corresponds to one of said key entries, the processor sets a flag associated with said one of said key entries, said flag being an indication that a positive response is associated with the RF tag from which said radio transmission is received.

2. The system as set forth in claim 1 further comprising at least one repeater operationally interposed at least one of said tags and said base station such that a transmission range of said at least one of said tags is extended to said base station.

3. The system as set forth in claim 2 further comprising at least one further repeater operationally interposed said at least one repeater and said base station such that said transmission range of said at least one of said tags is further extended to said base station.

4. The system as set forth in claim 1 wherein each of said tags is further operative to transmit said signal with a preselected temporality.

5. The system as set forth in claim 4 wherein each of said tags is operative to transmit said signal with a continuous temporality.

6. The system as set forth in claim 4 wherein each of said tags is operative to transmit said signal with a periodic temporality.

7. The system as set forth in claim 4 wherein each of said tags is operative to transmit said signal with an intermittent temporality.

8. The system as set forth in claim 4 wherein each of said tags is operative to transmit said signal with a random temporality.

9. The system as set forth in claim 8 wherein said base station is operative to discriminate between said signal transmitted from each one of said tags using a time slot of each transmitted signal.

10. The system as set forth in claim 4 wherein said temporality differs between a first group of said tags and a second group of said tags.

11. The system as set forth in claim 1 wherein said positive response is minimally indicative that each of said tags with which said positive response is associated is present and operable within said system.

12. The system as set forth in claim 11 wherein said signal transmitted from each of said tags is a frequency pulse.

13. The system as set forth in claim 1 wherein the processor being further operative to set a second flag associated with one of said key entries for which no radio transmission has been received by the base station from a RF tag associated with said one of said key entries, wherein said second flag being an indication that a negative response is associated with the RF tag associated with said one of said key entries.

14. The system as set forth in claim 1 wherein said identifying characteristic is a unique pattern of one or more codes for said signal transmitted from each respective one of said tags.

15. The system is set forth in claim 14 wherein said base station is operative to discriminate between said signal transmitted from each one of said tags using the unique pattern of one or more codes in one or more transmitted signals.

16. The system as set forth in claim 1 wherein said identifying characteristic is a different frequency for each signal transmitted from each respective one of said tags.

17. The system as set forth in claim 16 wherein said base station is operative to discriminate between said signal transmitted from each one of said tags using the frequency of each transmitted signal.

18. The system as set forth in claim 1 wherein said identifying characteristic is a different time slot for each signal transmitted from each respective one of said tags.

19. The system as set forth in claim 1 wherein said identifying characteristic is a key uniquely identifying each respective one of said tags placed in said signal transmitted from each respective one of said tags.

20. The system as set forth in claim 19 wherein each of said tags includes a memory, said key being stored in said memory.

21. The system as set forth in claim 20 wherein said memory is nonvolatile.

22. The system as set forth in claim 20 wherein said memory is flash memory.

23. The system as set forth in claim 20 wherein each of said tags further includes a tag transmitter, said key being applied to said tag transmitter in each of said tags, said tag transmitter in each of said tags being operative to transmit said signal from each of said tags.

24. The system as set forth in claim 23 wherein said signal transmitted from each of said tags is minimally said key unique to each of said tags.

25. The system as set forth in claim 1 wherein each of said tags is further operative to develop a timing pulse, said signal being transmitted from each of said tags in response to said timing pulse.

26. The system as set forth in claim 25 wherein each of said tags includes the tag transmitter and a clock counter to provide a binary count of a number of clock pulses applied thereto, said clock counter having a plurality of output bits, said timing pulse being developed in response to a selected one of said output bits transitioning from a first binary state to a second binary state, said tag transmitter transmitting said signal in response to said timing pulse.

27. The system as set forth in claim 26 wherein said timing pulse is developed in response to a logical combination of selected ones of said output bits transitioning from said first binary state to said second binary state.

28. The system as set forth in claim 26 wherein said selected one of said output bits is the same in each of said tags.

29. The system as set forth in claim 26 wherein said selected one of said output bits is different in each of said tags.

30. The system as set forth in claim 26 wherein said selected one of said output bits is the same in one group of said tags but different from said selected one of said output bits in another group of said tags.

31. The system as set forth in claim 26 wherein each of said tags further includes a clock to develop said clock pulses.

32. The system as set forth in claim 26 wherein said base station includes a clock to develop said clock pulses and a base station transmitter to which said clock pulses are applied and wherein each of said tags further includes a tag receiver, said base station transmitter transmitting said clock pulses, said tag receiver receiving said clock pulses and applying said clock pulses to said clock counter.

33. The system as set forth in claim 32 wherein said tag receiver further converts RF energy of the carrier of said clock pulses to DC power.

34. The system as set forth in claim 1 wherein for one of said tags with which said positive response has been associated, said base station is further operative to determine that a negative response is to be associated with said one of said tags in the event said signal ceases to be received from said one of said tags.

35. The system as set forth in claim 34 wherein said negative response is associated with said one of said tags upon expiration of a selected time duration from last receipt of said signal received from said one of said tags.

36. The system as set forth in claim 35 wherein said one of said tags is operative to transmit said signal there from with a preselected temporality, said selected time duration being commensurate with said temporality.

37. The system as set forth in claim 36 wherein each of said tags is operative to transmit periodically said signal, said selected time duration being commensurate with a periodicity of said signal.

38. The system as set forth in claim 34 wherein said base station is further operative to transmit a request to said one of said tags from which said signal is not received prior to said negative response being associated with said one of said tags, said one of said tags being further operative in response to said request to retransmit said signal, said base station being further operative to indicate that said positive response is associated with said one of said tags in the event said retransmitted signal is received by said base station and said negative response is associated with said one of said tags in the event said retransmitted signal is not received by said base station.

39. The system as set forth in claim 38 wherein said request includes an identifying characteristic of one of said tags, said one of said tags being further operative to verify that said identifying characteristic of said request corresponds to said identifying characteristic of said signal transmitted from said one of said tags such that upon verification said one of said tags is operative to retransmit said signal.

40. The system as set forth in claim 39 wherein said identifying characteristic in each of said request and said signal transmitted from said one of said tags is a key uniquely identifying said one of said tags.

41. The system as set forth in claim 34 wherein said base station includes a processor and a clock counter to which a plurality of clock pulses are applied, said clock counter having a reset input and a plurality of output bits at which a count of said clock pulses is developed, said processor applying a reset pulse to said reset input upon said processor setting a flag to indicate that said positive response has been associated with said one of said tags, said negative response to be associated with said one of said tags upon a selected one of said output bits transitioning from a first binary state to a second binary state.

42. The system as set forth in claim 41 wherein said processor removes said flag in response to said selected one of said output bits transitioning from said first binary state to said second binary state.

43. A system for electronic article surveillance, the system comprising:

a wireless base station comprising a clock counter that provides a binary count of a number of clock pulses applied thereto, said clock counter having a plurality of output bits, and a transmitter operable to generate a sync pulse in response to a selected one of said output bits transitioning from a first binary state to a second binary state; and a plurality of active RF tags being operable to attach to articles under surveillance, wherein each of said RF tags being operative to repeatedly initiate, independently from other RF tags an unsolicited radio transmission of a signal having a unique identifying characteristic of said RF tag and wherein each of said tags being responsive to said sync pulse from the base station to adjust the timing of the repetitive radio transmissions.

44. The system as set forth in claim 43 wherein said sync pulse is developed in response to a logical combination of selected ones of said output bits transitioning from said first binary state to said second binary state.

45. The system as set forth in claim 43 wherein said base station further includes a clock to develop said clock pulses.

46. The system as set forth in claim 43 wherein each of said tags is operative to transmit said signal after a selected time delay from receipt of said sync pulse wherein said time delay for each of said tags is selected such that said signal transmitted from each of said tags is received in succession at said base station.

47. The system as set forth in claim 46 wherein each of said tags includes a tag receiver, a clock counter to provide a binary count of a number of clock pulses applied thereto, said clock counter having a reset input and the plurality of output bits, said sync pulse being received by said tag receiver and said tag receiver applying said sync pulse to said reset input, said tag transmitter transmitting said signal in response to a timing pulse developed upon said selected one of said output bits changing state.

48. The system as set forth in claim 47 wherein said selected one of said output bits is different in each one of said tags.

49. A system for electronic article surveillance, the system comprising:

a base station and a plurality of active RF tags being operable to attach to articles under surveillance, wherein each of said RF tags being operative to repeatedly initiate, independently from other tags and the base station, an unsolicited radio transmission of a signal containing a data content, wherein the data content for each of said RF tags is variant in accordance with a function that implements an algorithm and wherein said data content for each of said RF tags is developed in accordance with said function from a seed value used by said algorithm wherein said seed value is stored in each of said tags; and wherein the base station being operative to receive a radio transmission from an RF tag and obtain data content from the received radio transmission, wherein said base station being knowledgeable of said function to verify said data content obtained from the radio transmission from said RF tag such that when verified said data content is valid and a positive response is associated with said RF tag and when not verified said data content is invalid and a negative response is associated with said RF tag.

50. The system as set forth in claim 49 wherein said data content is identical for two or more of said tags.

51. The system as set forth in claim 49 wherein said data content is different for each of said tags.

52. The system as set forth in claim 49 wherein said data content for each of said tags is a preselected bit string.

53. The system as set forth in claim 52 wherein said data content is a bit pattern of said preselected bit string, said base station recognizing said bit pattern to verify said data content.

54. The system as set forth in claim 49 wherein said data content for each of said tags is variant as a function of time.

55. The system as set forth in claim 49 wherein said data content for each one of said tags is variant as a function of a number of instances said signal is transmitted from a same one of said tags.

56. The system as set forth in claim 49 wherein said seed value is identical in each of said tags.

57. The system as set forth in claim 49 wherein said seed value is different in each of said tags.

58. The system as set forth in claim 49 wherein said seed value is an initialized bit string.

59. The system as set forth in claim 49 wherein said base station is further knowledgeable of said seed value stored in each of said tags to develop expected data content with which to verify said data content in said signal received from each of said tags.

60. The system as set forth in claim 59 wherein said base station is further operative to compare said expected data content to said data content in said signal received from each of said tags wherein said positive response is associated with each of said tags for which the comparison is positive and said negative response is associated with each of said tags for which the comparison is negative.

61. The system as set forth in claim 49 wherein each one of said tags includes a memory in which said seed is stored, a tag clock counter to which a succession of clock pulses is applied and having a plurality of output bits at which a count of said clock pulses is developed, a logic circuit to which each of said seed and at least one of said output bits of said count are applied to develop an output bit string applied to said transmitter, said transmitter being operative to transmit said signal wherein said output bit string is said data content in said signal.

62. The system as set forth in claim 61 wherein each of said tags further includes a register into which said output bit string is serially clocked and further wherein contents of said register is applied to said transmitter in response to a timing pulse.

63. The system as set forth in claim 62 wherein a current value of said at least one of said output bits of said clock counter is added to the contents of said register upon said timing pulse being developed such that said data content contains said at least one of said output bits and the contents of said register.

64. The system as set forth in claim 63 wherein a current value of said output bits is added to the contents of said register.

65. The system as set forth in claim 62 wherein said timing pulse is developed in response to a selected one of said output bits of said clock counter transitioning from a first binary state to a second binary state.

66. The system as set forth in claim 61 wherein each of said tags further includes a clock to develop said succession of clock pulses.

67. The system as set forth in claim 61 wherein said base station includes a processor, a lookup table containing said seed associated with each of said tags, a clock to develop said succession of clock pulses, a base station clock counter having a plurality of output bits at which a count of said clock pulses is developed and a transmitter operative to transmit said clock pulses to each of said tags, each of said tags further including a receiver to receive said clock pulses and to apply said clock pulses to said tag clock counter, said base station clock counter developing a value at least one of said output bits of said base station clock counter in lockstep with said at least one of said output bits of said tag clock counter, said processor developing expected data content from each of said seed in said lookup table associated with said one of said tags and said at least one of said output bits of said base station, clock counter in accordance with said algorithm as implemented by said logic circuit, said processor verifying said data content in said signal received from each of said tags to said expected data content developed for each of said tags.

68. The system as set forth in claim 67 wherein said processor is further operative to develop a sync pulse to reset each of said base station clock counter and said tag clock counter in each of said tags, each of said tags being responsive to said sync pulse to reset said counter.

69. The system as set forth in claim 68 wherein said base station further includes a transmitter to transmit said sync pulse to each of said tags and wherein each of said tags operative to receive using the receiver said sync pulse and to apply said sync pulse to said counter.

70. The system as set forth in claim 49 wherein each respective one of said tags includes a memory in which said seed is stored, an instance counter having a plurality of output bits at which a count of a number of instances of said signal has been transmitted from said respective one of said tags, a logic circuit to which each of said seed and said count are applied and operative to develop an output bit string, and a transmitter to which said output bit string is applied, said transmitter being operative to transmit said signal.

71. The system as set forth in claim 70 wherein each of said tags further includes a register into which said output bit string is serially clocked and further wherein contents of said register is applied to said transmitter in response to a timing pulse.

72. The system as set forth in claim 71 wherein said instance counter is incremented in response to said timing pulse.

73. The system is set forth in claim 71 wherein each respective one of said tags further includes a clock counter to which a succession of clock pulses is applied to develop a binary count of said clock pulses, said clock counter having a selected output bit, said timing pulse being developed in response to said selected output bit transitioning from a first binary state to a second binary state.

74. The system as set forth in claim 73 wherein each of said tags further includes a clock to develop said succession of clock pulses.

75. The system as set forth in claim 73 wherein said base station includes a clock to develop said succession of clock pulses and a transmitter operative to transmit said clock pulses to each of said tags, each of said tags further including a receiver to receive said clock pulses and to apply said clock pulses to said clock counter.

76. The system as set forth in claim 70 wherein said base station is further operative to develop a sync pulse, each of said tags being responsive to said sync pulse to reset said instance counter.

77. The system as set forth in claim 76 wherein each of said tags further includes a receiver operative to receive said sync pulse and to apply said sync pulse to said instance counter.

78. The system as set forth in claim 49 wherein each of said tags includes:

a n-bit wide shift register having a plurality of cascaded gates, said seed being applied as a bit string to said shift register, each of said gates having a Q and a $\overline{Q}$ output; and a logic circuit having a plurality of inputs and an output, each of said inputs being connected to a selected one of said Q and said $\overline{Q}$ output of a corresponding one of said gates, said data content of said signal being an output bit string developed at said output.

79. The system as set forth in claim 78 wherein each of said tags further includes a memory to store said seed.

80. The system as set forth in claim 78 wherein said seed is transmitted to each of said tags by said base station.

81. The system as set forth in claim 78 wherein a number, of said inputs is less than a number of said gates.

82. The system as set forth in claim 78 wherein each of said gates further has a D input, said D input being selectively connected to one of said Q output and said $\overline{Q}$ output of an immediately preceding one of said gates.

83. The system as set forth in claim 78 further comprising a standard gate to which said seed and an output bit of a selected one of said Q output and said $\overline{Q}$ output of a least significant one of said gates are applied.

84. The system as set forth in claim 78 wherein each of said tags further includes:

a buffer containing said output bit string from said output;

a counter containing a count of a selected one of clock pulses applied to said counter and each instance of said signal being transmitted from each respective one of said tags, said counter having a plurality of output bits; and a second logic circuit operative to combine logically said output bit string in said buffer with at least one of said output bits of said counter whereby said data content for signal for each respective one of said tags is developed.

85. The system as set forth in claim 78 wherein said seed is bitwise clocked into said shift register such that each bit of said output bit string is developed as each bit of said seed is applied to said shift register.

86. The system as set forth in claim 85 wherein each of said tags further includes a tag transmitter, said output bit string being bitwise applied to said transmitter.

87. The system as set forth in claim 78 wherein said base station is further knowledgeable of said seed value stored in each of said tags to develop expected data content with which to verify said data content in said signal received from each of said tags.

88. The system as set forth in claim 87 wherein said base station is further operative to compare said expected data content to said data content in said signal received from each of said tags wherein said positive response is associated with each of said tag for which the comparison is positive and said negative response is associated with each of said tags for which the comparison is negative.

89. The system as set forth in claim 88 wherein said base station includes a receiver to receive said signal from each one of said tags and a processor operative to read said data content in said signal from each one of said tags and compare said data content to said expected data for each one of said tags.

90. The system as set forth in claim 87 wherein said processor is further operative to generate contemporaneously said expected data for each one of said tags.

91. A method for electronic article surveillance, the method comprising:

receiving, at a base station, an unsolicited radio transmission of a signal from at least one of a plurality of active RF tags attached to articles under surveillance, the radio transmission being initiated by said at least one RF tag independent of the base station and of other of the plurality of RF tags, wherein said signal having a unique identifying characteristic of said at least one RF tag:

accessing, in a memory of the base station, a lookup table containing a plurality of key entries corresponding to each of the plurality of RF tags;

determine whether the identifying characteristic of said at least one RF tag corresponds to one of the key entries in the lookup table: and in the event said identifying characteristic corresponds to one of said key entries, setting a flag associated with said one of said key entries, wherein said flag being an indication that a positive response is associated with said at least one RF tag.

92. The method as set forth in claim 91 further comprising providing at least one repeater operationally interposed at least one of said tags and said base station such that a transmission range of said at least one of said tags is extended to said base station.

93. The method as set forth in claim 92 further comprising providing at least one further repeater operationally interposed said at least one repeater and said base station such that said transmission range of said at least one of said tags is further extended to said base station.

94. The method as set forth in claim 93 wherein each of said tags is further operative to transmit said signal with a preselected temporality.

95. The method as set forth in claim 94 wherein each of said tags is operative to transmit said signal with a continuous temporality.

96. The method as set forth in claim 94 wherein each of said tags is operative to transmit said signal with a periodic temporality.

97. The method as set forth in claim 94 wherein each of said tags is operative to transmit said signal with an intermittent temporality.

98. The method as set forth in claim 94 wherein each of said tags is operative to transmit said signal with a random temporality.

99. The method as set forth in claim 94 wherein said signal temporality differs between a first group of said tags and a second group of said tags.

100. The method as set forth in claim 91 wherein said positive response is minimally indicative that each of said tags with which said positive response is associated is present and operable within said system.

101. The method as set forth in claim 100 wherein said signal transmitted from each of said tags is a frequency pulse.

102. The method as set forth in claim 91 wherein said signal transmitted from each of said tags further includes an informational characteristic, said base station being further knowledgeable of and operative to verify said informational characteristic in said signal transmitted from each of said tags such that a negative response is associated with anyone of said tags for which said informational characteristic in said transmitted therefrom fails verification.

103. The method as set forth in claim 91 wherein said identifying characteristic is a unique pattern of one or more codes for said signal transmitted from each respective one of said tags.

104. The method as set forth in claim 103 wherein said base station is operative to discriminate between said signal transmitted from each one of said tags using the unique pattern of one or more codes in one or more transmitted signal.

105. The method as set forth in claim 91 wherein said identifying characteristic is a different frequency for each signal transmitted from each respective one of said tags.

106. The method as set forth in claim 105 wherein said base station is operative to discriminate between said signal transmitted from each one of said tags using the frequency of each transmitted signal.

107. The method as set forth in claim 91 wherein said identifying characteristic is a different time slot for each signal transmitted from each respective one of said tags.

108. The method as set forth in claim 107 wherein said base station is operative to discriminate between said signal transmitted from each one of said tags using the time slot of each transmitted signal.

109. The method as set forth in claim 91 wherein said identifying characteristic is a key uniquely identifying each respective one of said tags placed in said signal transmitted from each respective one of said tags.

110. The method as set forth in claim 109 wherein each of said tags includes a memory, said key being stored in said memory.

111. The method as set forth in claim 110 wherein said memory is nonvolatile.

112. The method as set forth in claim 110 wherein said memory is flash memory.

113. The method as set forth in claim 110 wherein each of said tags further includes a tag transmitter, said key being applied to said tag transmitter in each of said tags, said tag transmitter in each of said tags being operative to transmit said signal from each of said tags.

114. The method as set forth in claim 113 wherein said signal transmitted from each of said tags is minimally said key unique to each of said tags.

115. The method as set forth in claim 91 wherein each of said tags is further operative to develop a timing pulse, said signal being transmitted from each of said tags in response to said timing pulse.

116. The method as set forth in claim 115 wherein each of said tags includes a tag transmitter and a clock counter to provide a binary count of a number of clock pulses applied thereto, said clock counter having a plurality of output bits, said timing pulse being developed in response to a selected one of said output bits transitioning from a first binary state to a second binary state, said tag transmitter transmitting said signal in response to said timing pulse.

117. The method as set forth in claim 116 wherein said timing pulse is developed in response to a logical combination of selected ones of said output bits transitioning from said first binary state to said second binary state.

118. The method as set forth in claim 116 wherein said selected one of said output bits is the same in each of said tags.

119. The method as set forth in claim 116 wherein said selected one of said output bits is different in each of said tags.

120. The method as set forth in claim 116 wherein said selected one of said output bits is the same in one group of said tags but different from said selected one of said output bits in another group of said tags.

121. The method as set forth in claim 116 wherein each of said tags further includes a clock to develop said clock pulses.

122. The method as set forth in claim 116 wherein said base station includes a clock to develop said clock pulses and a base station transmitter to which said clock pulses are applied and wherein each of said tags further includes a tag receiver, said base station transmitter transmitting said clock pulses, said tag receiver receiving said clock pulses and applying said clock pulses to said clock counter.

123. The method as set forth in claim 122 wherein said tag receiver further converts RF energy of the carrier of said clock pulses to DC power.

124. The method as set forth in claim 91 wherein for one of said tags with which said positive response has been associated, said base station is further operative to determine that a negative response is to be associated with said one of said tags in the event said signal ceases to be received from said one of said tags.

125. The method as set forth in claim 124 wherein said negative response is associated with said one of said tags upon expiration of a selected time duration from last receipt of said signal received from said one of said tags.

126. The method as set forth in claim 124 wherein said one of said tags is operative to transmit said signal there from with a preselected temporality, a selected time duration being commensurate with said temporality.

127. The method as set forth in claim 126 wherein each of said tags is operative to transmit periodically said signal, said selected time duration being commensurate with a periodicity of said signal.

128. The method as set forth in claim 124 wherein said base station includes a processor and a clock counter to which a plurality of clock pulses are applied, said clock counter having a reset input and a plurality of output bits at which a count of said clock pulses is developed, said processor applying a reset pulse to said reset input upon said processor setting a flag to indicate that said positive response has been associated with said one of said tags, said negative response to be associated with said one of said tags upon a selected one of said output bits transitioning from a first binary state to a second binary state.

129. The method as set forth in claim 128 wherein said processor removes said flag in response to said selected one of said output bits transitioning from said first binary state to said second binary state.

130. The method as set forth in claim 128 wherein said processor is further operative to develop a request to retransmit said signal wherein said request is to be transmitted to said one of said tags in response to said selected one of said output bits transitioning from said first binary state to said second binary state.

131. The method as set forth in claim 130 wherein said processor maintains said flag in the event a retransmitted signal is received from said one of said tags in response to said request such that said positive response continues to be associated with said one of said tags.

132. The method as set forth in claim 131 wherein said processor applies a reset pulse to said clock counter upon said retransmitted signal being received by said base station.

133. The method as set forth in claim 130 wherein said processor remove said flag in the event said retransmitted signal is not received by said base station in response to said request such that said negative response is associated with said one of said tags.

134. The method as set forth in claim 130 wherein said processor accessing said lookup table to read said key for said one of said tags to develop said request wherein said request includes said key.

135. A method for electronic article surveillance, the method comprising:
transmitting by a base station a sync pulse to a plurality of active RF tags attached to articles under surveillance;
responsive to the sync pulse, receiving from the plurality of RF tags a succession of radio transmissions of signals having unique identifying characteristics of said RF tags, wherein each signal is transmitted by each of said plurality of RF tags after a selected time delay from receipt of said sync pulse by said RF tags, wherein said time delay for each of said tags is selected such that said signal transmitted from each of said tags is received in succession at said base station;
knowledgeable of said identifying characteristics of said signals, discriminating between said signals transmitted from each of said RF tags, and
indicating that a positive response is associated with each of said tags from which said signal is received and a negative response is associated with each of said tags from which said signal is not received.

136. The method as set forth in claim 135 wherein said base station includes a base station transmitter and a clock counter to provide a binary count of a number of clock pulses applied thereto and wherein each of said tags includes a tag receiver and a tag transmitter, said clock counter having a plurality of output bits, said sync pulse being developed in response to a selected one of said output bits transitioning from a first binary state to a second binary state, said sync pulse being transmitted by said base station transmitter and received by said tag receiver, said tag receiver applying said sync pulse to said tag transmitter, said tag transmitter transmitting said signal in response to said sync pulse.

137. The method as set forth in claim 136 wherein said sync pulse is developed in response to a logical combination of selected ones of said output bits transitioning from said first binary state to said second binary state.

138. The method as set forth in claim 136 wherein said base station further includes a clock to develop said clock pulses.

139. The method as set forth in claim 135 wherein each of said tags includes a tag receiver, a clock counter to provide a binary count of a number of clock pulses applied thereto, said clock counter having a reset input and a plurality of output bits, said sync pulse being received by said tag receiver and said tag receiver applying said sync pulse to said reset input, a tag transmitter transmitting said signal in response to a timing pulse developed upon said selected one of said output bits changing state.

140. The method as set forth in claim 139 wherein said selected one of said output bits is different in each one of said tags.

141. A method for electronic article surveillance using a plurality of active RF tags attached to articles under surveillance, the method comprising:
obtaining a seed value from a memory of a RF tag of said plurality of RF tags;
executing a function that implements an algorithm for generating a data content from the obtained seed value, wherein data content for each of said RF tags is variant in accordance with said function; and
transmitting by said RF tag independently from other tags of said plurality of RF tags an unsolicited radio transmission of a signal containing said generated data content,
wherein the data content obtained from the radio transmission from said RF tag is used by a base station to verify said data content such that when verified said data content is valid and a positive response is associated with said RF tag and when not verified said data content is invalid and a negative response is associated with said RF tag.

142. The method as set forth in claim 141 wherein said data content is identical for two or more of said tags.

143. The method as set forth in claim 141 wherein said data content is different for two or more of said tags.

144. The method as set forth in claim 141 wherein said data content for each of said tags is a preselected bit string.

145. The method as set forth in claim 144 wherein said data content is a bit pattern of said preselected bit string, said base station recognizing said bit pattern to verify said data content.

146. The method as set forth in claim 141 wherein said data content for each of said tags is variant as a function of time.

147. The method as set forth in claim 141 wherein said data content for each one of said tags is variant as a function of a number of instances said signal is transmitted from a same one of said tags.

148. The method as set forth in claim 141 wherein said seed value is identical in each of said tags.

149. The method as set forth in claim 141 wherein said seed value is different in each of said tags.

150. The method as set forth in claim 141 wherein said seed value is an initialized bit string.

151. The method as set forth in claim 141 wherein said base station is further knowledgeable of said seed value stored in each of said tags to develop expected data content with which to verify said data content in said signal received from each of said tags.

152. The method as set forth in claim 151 wherein said base station is further operative to compare said expected data content to said data content in said signal received from each of said tags wherein said positive response is associated with each of said tags for which the comparison is positive and said negative response is associated with each of said tags for which the comparison is negative.

153. The method as set forth in claim 151 wherein each one of said tags includes a tag clock counter to which a succession of clock pulses is applied and having a plurality of output bits at which a count of said clock pulses is developed, a logic circuit to which each of said seed and at least one of said output bits of said count are applied to develop an output bit string applied to a transmitter, said transmitter being operative to transmit said signal wherein said output bit string is said data content in said signal.

154. The method as set forth in claim 153 wherein each of said tags further includes a register into which said output bit string is serially clocked and further wherein contents of said register is applied to said transmitter in response to a timing pulse.

155. The method as set forth in claim 154 wherein a current value of said at least one of said output bits of said clock counter is added to the contents of said register upon said timing pulse being developed such that said data content contains said at least one of said output bits and the contents of said register.

156. The method as set forth in claim 155 wherein a current value of said output bits is added to the contents of said register.

157. The method as set forth in claim 154 wherein said timing pulse is developed in response to a selected one of said output bits of said clock counter transitioning from a first binary state to a second binary state.

158. The method as set forth in claim 153 wherein each of said tags further includes a clock to develop said succession of clock pulses.

159. The method as set forth in claim 153 wherein said base station includes a processor, a lookup table containing said seed associated with each of said tags, a clock to develop said succession of clock pulses, a base station clock counter having a plurality of output bits at which a count of said clock pulses is developed and a transmitter operative to transmit said clock pulses to each of said tags, each of said tags further including a receiver to receive said clock pulses and to apply said clock pulses to said tag clock counter, said base station clock counter developing a value at least one of said output bits of said base station clock counter in lockstep with said at least one of said output bits of said tag clock counter, said processor developing expected data content from each of said seed in said lookup table associated with said one of said tags and said at least one of said output bits of said base station clock counter in accordance with said algorithm as implemented by said logic circuit, said processor verifying said data content in said signal received from each of said tags to said expected data content developed for each of said tags.

160. The method as set forth in claim 159 wherein said processor is further operative to develop a sync pulse to reset each of said base station clock counter and said tag clock counter in each of said tags, each of said tags being responsive to said sync pulse to reset said counter.

161. The method as set forth in claim 160 wherein said base station further includes a transmitter to transmit said sync pulse to each of said tags and wherein each of said tags further includes a receiver operative to receive said sync pulse and to apply said sync pulse to said counter.

162. The method as set forth in claim 141 wherein each respective one of said tags includes an instance counter having a plurality of output bits at which a count of a number of instances of said signal has been transmitted from said respective one of said tags, a logic circuit to which each of said seed and said count are applied and operative to develop an output bit string, and a transmitter to which said output bit string is applied, said transmitter being operative to transmit said signal.

163. The method as set forth in claim 162 wherein each of said tags further includes a register into which said output bit string is serially clocked and further wherein contents of said register is applied to said transmitter in response to a timing pulse.

164. The method as set forth in claim 163 wherein said instance counter is incremented in response to said timing pulse.

165. The method as set forth in claim 163 wherein each respective one of said tags further includes a clock counter to which a succession of clock pulses is applied to develop a binary count of said clock pulses, said clock counter having a selected output bit, said timing pulse being developed in response to said selected output bit transitioning from a first binary state to a second binary state.

166. The method as set forth in claim 165 wherein each of said tags further includes a clock to develop said succession of clock pulses.

167. The method as set forth in claim 165 wherein said base station includes a clock to develop said succession of clock pulses and a transmitter operative to transmit said clock pulses to each of said tags, each of said tags further including a receiver to receive said clock pulses and to apply said clock pulses to said clock counter.

168. The method as set forth in claim 162 wherein said base station is further operative to develop a sync pulse, each of said tags being responsive to said sync pulse to reset said instance counter.

169. The method as set forth in claim 168 wherein each of said tags further includes a receiver operative to receive said sync pulse and to apply said sync pulse to said instance counter.

170. The method as set forth in claim 141 wherein each of said tags includes:
a n-bit wide shift register having a plurality of cascaded gates, said seed being applied as a bit string to said shift register, each of said gates having a Q output and a $\overline{Q}$ output; and a logic circuit having a plurality of inputs and an output, each of said inputs being connected to a selected one of said Q output and said $\overline{Q}$ output of a corresponding one of said gates, said data content of said signal being an output bit string developed at said output.

171. The method as set forth in claim 170 wherein each of said tags further includes a memory to store said seed.

172. The method as set forth in claim 170 wherein said seed is transmitted to each of said tags by said base station.

173. The method as set forth in claim 170 wherein a number, of said inputs is less than a number of said gates.

174. The method as set forth in claim 170 wherein each of said gates further has a D input, said D input being selectively connected to one of said Q output and said $\overline{Q}$ output of an immediately preceding one of said gates.

175. The method as set forth in claim 170 further comprising a standard gate to which said seed and an output bit of a selected one of said Q output and said $\overline{Q}$ output of a least significant one of said gates are applied.

176. The method as set forth in claim 170 wherein each of said tags further includes:
- a buffer containing said output bit string from said output;
- a counter containing a count of a selected one of clock pulses applied to said counter and each instance of said signal being transmitted from each respective one of said tags, said counter having a plurality of output bits; and
- a second logic circuit operative to combine logically said output bit string in said buffer with at least one of said output bits of said counter whereby said data content for said signal for each respective one of said tags is developed.

* * * * *